United States Patent [19]

Kimmelaar

[11] 4,252,381
[45] Feb. 24, 1981

[54] MACHINE SLIDEWAY

[75] Inventor: Rudolf J. A. Kimmelaar, Vlaardingen, Netherlands

[73] Assignee: Cincinnati Milacron Inc., Cincinnati, Ohio

[21] Appl. No.: 75,258

[22] Filed: Sep. 13, 1979

[51] Int. Cl.³ .................. F16C 29/02; F16C 32/06
[52] U.S. Cl. .................. 308/3 A; 308/3 C; 308/5 R
[58] Field of Search ........... 308/3 A, 5 R, DIG. 1, 308/240, 3 C, 3 R

[56] References Cited
U.S. PATENT DOCUMENTS 3,109,514  11/1963  Deflandre ...................... 308/5 R
3,277,696  10/1966  Gertel ........................ 308/DIG. 1
3,545,366  12/1970  Bruhin ........................ 308/5 R
3,744,858  7/1973   Weichsel ...................... 308/5 R Primary Examiner—Lenard A. Footland
Attorney, Agent, or Firm—Thomas M. Farrell

[57] ABSTRACT

An improved slideway configuration is disclosed wherein a first slide has a first slide surface adapted to be moved along a second slide, and the first slide surface has a plurality of serrations formed in a central area defined in the first slide surface. A continuously smooth portion of the first slide surface borders the serrated central area, and lubricant-bearing pressurized fluid is introduced to the serrated central area to relieve the normal load and more evenly distribute lubricant.

7 Claims, 6 Drawing Figures

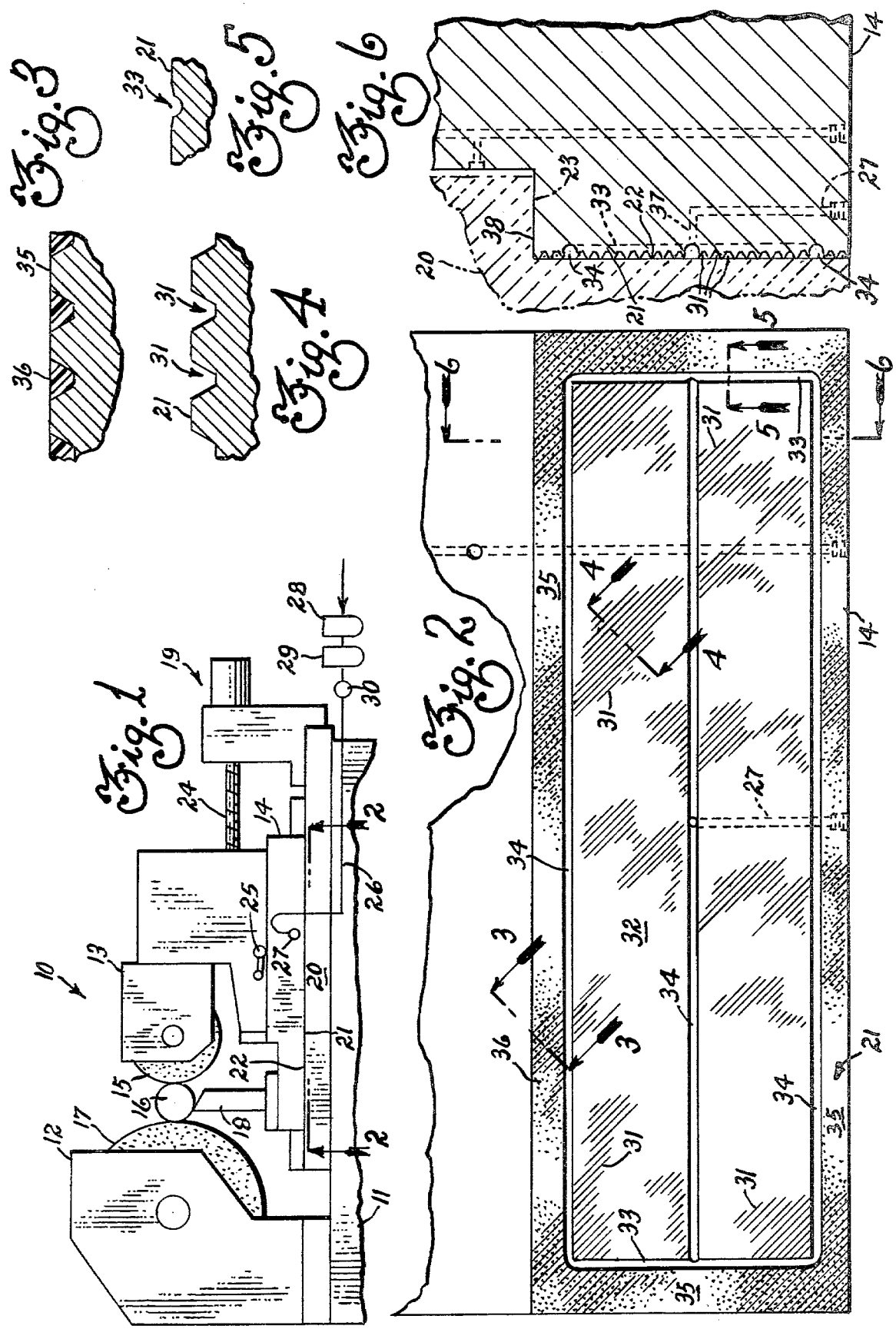

MACHINE SLIDEWAY

BACKGROUND OF THE INVENTION

The invention relates generally to machine slideways for supporting machine elements on relatively movable slides. In machine slideway art, particularly in those used in machine tools where the slideways and their associated components are relatively heavy (such as grinding wheelheads), it has long been a problem to create a machine slideway which is capable of relatively small, precise steps of movement in normal operation, which steps may be necessitated by tool wear or grinding wheel reduction as in a centerless grinder, and it is desirable to compensate the grinding wheel (or work) support slide to maintain sizing of the workpiece. The phenomenon of friction is well-known to machine designers, and, in particular, a related phenomenon known as "stick-slip" is frequently encountered when the weight of the components assumes a large magnitude, as in a centerless grinder regulating wheel support slide. The coefficient of friction is generally thought to be a relative term created by the materials of the components bearing on one another. While the phenomenon of stick-slip is not totally understood, it is thought that a certain attraction may develop between two members bearing on one another, and, on a microscopic scale, the very minute craggy surface textures may become mechanically intermeshed with one another to cause a drag at such time as may become necessary to relatively move the components.

Several prior art slideway designs have been attempted to accomplish a smooth relative movement of one slide to another, such as: (a) plain slideways, wherein both relatively moved components are finely scraped or ground, to try to divide lubrication oil over the whole sliding surface; (b) a serrated moving member of a slidway moving on a finely scraped mating member, attempting to still further lubricate the interface surface with a lubricant; (c) ball track or needle roller supports, wherein the antifriction elements are mounted in a cage and roll on hardened strips mounted to mating slideways; (d) plain slideway and cooperating antislip material such as the well-known fluorocarbon plastic inserts; (e) hydrostatic pockets provided to lift a slide on an oil film against a mating part. Many disadvantages are inherent in the prior art slideway designs. For example, the plain slideways have a high friction potential and pickup between the interface materials may be due to any lack of lubricant—in combination with vibratory loads. The serrated slides (especially where cast iron is used against cast iron) resulted in a great improvement over the lubricated plain slides, however, one cannot be insured that lubricant will be totally spread over every position of the slide on its mating part. Therefore, stick-slip and a substantial amount of friction are usually present and thus, it is difficult to maintain good repeatability of compensation movements with this type slide. The antifriction roller assemblies are disadvantages in the fact that pure rolling is not generally obtainable, but a combination of sliding and rolling may exist, wherein the rollers and their cages tend to migrate to end of the slide or the other. Further, the rollers or balls may tend to brinell into the support track surface, thus interfering further with the preload and smooth rolling of the assembly. The use of antifriction way material very definitely results in no-pickup under vibratory loads and small stick-slip problems. However, wear is great problem, resulting in replacement of machine elements to insure sizing capabilities of the machine which creates an overall expensive assembly. The hydrostatic pocket method of supporting slideways gives an extremely low friction slide assembly, with no stick-slip problems, but this type of antifriction slideway is disadvantageous for precision machines such as grinders, because of its low damping capacity and lower static stiffnesses, which will result in a lesser ability to dampen any machine vibrations. Further, it is a great problem to collect oil and drain it away from the slide assembly and keep the oil free of contaminents. Sealing of the slideway is difficult in the presence of chips and swarf, etc.

Applicant has obviated the difficulties inherent in these prior art slideways.

SUMMARY OF THE INVENTION

The invention is shown embodied in a machine slideway system having a first slide surface of a first slideway adapted to be relatively moved along a second slide surface. A plurality of serrations are formed in a central area in the first slide surface disposed toward the second slide surface, and a substantially continuous, smooth surface portion of the first slide surface borders the central area. Fluid porting means are provided for introducing pressurized fluid to substantially all of the serrations in the central area, and the pressurized fluid is preferably air mixed with lubricating oil. The pressurized fluid tends to lubricate and support the slideway, be relieving a portion of the load, and the serrations served to reduce the surface area at the interface of the first and second slide surfaces thus, a more positive spreading and uniform distribution of the lubrication oil is thereby accomplished.

BRIEF DESCRIPTION OF THE DRAWINGS

FIG. 1 is a front elevation of a centerless grinder machine tool employing the present invention.

FIG. 2 is a view of the bottom surface of the machine tool slideway employing the present invention, taken along the direction 2—2 of FIG. 1.

FIG. 3 is a section view taken along the lines 3—3 of FIG. 2.

FIG. 4 is a section view taken along the line 4—4 of FIG. 2.

FIG. 5 is a typical groove section taken along the line 5—5 of FIG. 2.

FIG. 6 is a section view taken along the lines 6—6 of FIG. 2.

DESCRIPTION OF THE PREFERRED EMBODIMENT

Referring to the drawings, FIG. 1 depicts in elevation, a centerless grinder machine 10 employing the present invention, wherein the machine 10 is generally configured of well-known centerless grinder elements, for example; a base 11 carrying a grinding wheelhead 12; a regulating wheelhead 13 supported on a slideway 14 for linear travel of the regulating wheel 15 with respect to the workpiece 16 and grinding wheel 17; a work support 18 carried by the slideway 14 as well, wherein the slideway 14 and a feeding unit are both carried by the machine swivel plate 20 resting on the base 11.

The slideway 14 has a lower first slide surface 21 adapted to bear against a second slide surface 22 which comprises the top of the swivel plate 20. The swivel plate 20 has a central key portion 23 to keep the slideway 14 from shifting to one side or the other in its excursion. The feeding unit 19 is relatively stationary with respect to the slideway 14, and a feed screw 24 is rotatable in the feeding unit 19 and adapted to propel the regulating wheel housing 13 and its associated slideway 14 (to which it is clamped by a conventional clamp means 25) back and forth on the swivel plate 20. As shown diagramatically in FIG. 1, a fluid pressure line 26 is adapted to a port 27 in the side of the slideway 14, and receives pressurized fluid, preferably air mixed with a lubricant oil. In conventional manner, the air, form a pressurizing source such as compressor (not shown), first enters a line filter 28 to clear the air of contaminants and water, then passes through a lubricating unit 29 where the oil is picked up by air, and the air thereafter passes through a pressure regulator 30 to control the fluid pressure to a desired set point.

FIG. 2 is a bottommost view looking at the pertinent portion of the slideway slide surface 21. The slideway 20 bearing surface 21 is machined with a plurality of diagonal serrations 31 cut in a central area 32 (approx. 0.02" deep) defined in the first slide surface 21 according to the serration profile shown in the section of FIG. 4. The central area 32 is boundered by end grooves 33, depicted in cross section in FIG. 5, and transverse grooves 34 serve to connect the end grooves 33 of the boundary groove for ease of distribution of fluid. In the preferred embodiment, the serrations 31 are cut entirely across the slideway bearing surface 21, and thereafter the portion 35 of the slideway surface outside the boundary groove, i.e., a substantially continuous and smooth portion of the first slide surface 21, is created by filling the border area with an epoxy composition 36 which is relatively softer than the slideway material (see FIG. 3). As shown in the dotted lines, the port 27 for introducing pressurized air and lubricant fluid into the slideway 14 is shown together with an appropriate cross-drilling hole 37 to permit introduction of the fluid to the transverse groove 33 of the slideway surface.

The view of FIG. 6 is a cross-sectional view through the slideway 14, illustrating the grooves 33,34 and the fluid ports 27,37 and the cooperating slide surface 22 of the swivel plate 20 is shown in phantom with the key portion 23 in smooth bearing engagement with the inside edge 38 of the slideway surface 21 to prevent shifting of the slideway 14 during its excursion.

The relatively softer portion 35 of the first bearing surface 21, i.e., the area having epoxy, or the like, as a filler, serves in great part, to provide a pressure seal to control the escape of air pressure from the serrations 31 of the central area 32, and a further advantage is had by virture of the fact that as the machine wear mechanism takes place, any small particles of the cooperating slides 14,20, which break loose, or other contaminants which may be present on the slide surfaces, will tend to become embedded in the softer portion 35 of the slideway surface 21 thereby insuring a relatively trouble-free interface of the slide surfaces 21,22. The pressurized central area 32 tends to insure two things; (a) the lubricant is more uniformly distributed over the slide surface as compared to mere static lubrication; and (b) the machine slide weight is descreased by the supporting force resulting from the pressure times the central area 32, which serves to lessen the liklihood of stick-slip while preserving variation damping characteristics. The slideway of this invention maintains the desirable features of the plain slideways, in that a better control and damping of chatter and other vibrations (slide rumble) permits relatively small movements of the slideway to be made relative to its supporting slide with the desired performance as to repeatability of slide movement.

The invention is not limited to the specific embodiments shown herein, but rather the invention extends to all such designs and modifications as come within the scope of the appended claims.

What is claimed is:

1. A slideway for machine tools, comprising:
   (a) a first slide having a first slide surface adapted to be moved relatively along a cooperating second slide surface;
   (b) a plurality of serrations formed in a central area defined in said first slide surface;
   (c) a substantially continuous and smooth portion formed on said first slide surface bordering said central area, said portion comprised, in part, of a material softer than either of the first or second slide surfaces;
   (d) a boundary groove in said first slide surface traversing the interface of said central area and said continuous and smooth portion, said groove interconnecting substantially all of said serrations;
   (e) means for communicating fluid to said serrations.

2. The slideway of claim 1, wherein said means for communicating fluid is a fluid port in said first slide.

3. A method for supporting a machine slide, comprising the following steps;:
   (a) forming a smooth support surface on a lower face of said slide;
   (b) forming a plurality of serrations in a central area defined in said support surface so as to create a smooth surface portion bordering said central area;
   (c) interconnecting substantially all of said serrations;
   (d) grooving said surface along the boundary of said central area;
   (e) mounting said machine slide to a relatively stationary second slide;
   (f) introducing a pressurized mixture of air and oil to said serrations; and
   (g) moving said machine slide on said second slide while said serrations are pressurized.

4. An improved slideway, comprising;
   (a) a first slide surface on said slideway, adapted to be relatively moved along a cooperating second slide surface;
   (b) a plurality of serrations in a central area defined in said first slide surface;
   (c) a substantially continuous and smooth portion of said first slide surface bordering said central area, said continuous and smooth portion of said first slide surface comprised, in part, of a material softer than either of the first or second slide surfaces; and
   (d) means for introducing pressurized fluid to substantially all of said serrations in said central area.

5. An improved machine slideway, comprising:
   (a) a first slide surface on said slideway, adapted to be relatively moved along a cooperating second slide surface;
   (b) a plurality of serrations in a central area defined in said first slide surface;
   (c) a substantially continuous and smooth portion of said first slide surface bordering said central area, said continuous and smooth portion of said first slide surface comprised, in part, of a material softer than either of the first or second slide surfaces;

(d) a groove interconnecting substantially all of said serrations in said central area; and
(e) a fluid port in said slideway communicating with said groove.

6. An imporved slideway, comprising:
(a) a first slide surface on said slideway, adapted to be relatively moved along a cooperating second slide surface;
(b) a plurality of serrations in a central area defined in said first slide surface;
(c) a substantially continuous and smooth portion of said first slide surface bordering said central area;
(d) means for introducing pressurized fluid to substantially all of said serrations in said central area; and
(e) a boundary groove in said first slide surface traversing the interface of said central area and said continuous and smooth portion.

7. An improved machine slideway, comprising:
(a) a first slide surface on said slideway, adapted to be relatively moved along a cooperating second slide surface;
(b) a plurality of serrations in a central area defined in said first slide surface;
(c) a substantially continuous and smooth portion of said first slide surface bordering said central area;
(d) a groove interconnecting substantially all of said serrations in said central area;
(e) a fluid port in said slideway communicating with said groove; and
(f) a boundary groove in said first slide surface traversing the interface of said central area and said continuous and smooth portion.

* * * * *